(12) United States Patent
Lu et al.

(10) Patent No.: US 11,892,006 B2
(45) Date of Patent: Feb. 6, 2024

(54) BAFFLE ELEMENT, DIFFUSER PLATE, AND SEAL SYSTEM INCORPORATING A BAFFLE ELEMENT AND A DIFFUSER PLATE

(71) Applicant: Cummins Limited, London (GB)

(72) Inventors: Yao Lu, Jiangsu (CN); Chris Witkowski, London (GB); Matthew Purdey, London (GB)

(73) Assignee: CUMMINS LIMITED, London (GB)

( * ) Notice: Subject to any disclaimer, the term of this patent is extended or adjusted under 35 U.S.C. 154(b) by 24 days.

(21) Appl. No.: 17/639,267

(22) PCT Filed: Aug. 28, 2019

(86) PCT No.: PCT/CN2019/102974
§ 371 (c)(1),
(2) Date: Feb. 28, 2022

(87) PCT Pub. No.: WO2021/035564
PCT Pub. Date: Mar. 4, 2021

(65) Prior Publication Data
US 2022/0333609 A1    Oct. 20, 2022

(51) Int. Cl.
*F04D 29/10*    (2006.01)
*F02B 39/14*    (2006.01)
*F04D 29/063*    (2006.01)

(52) U.S. Cl.
CPC ............ *F04D 29/102* (2013.01); *F02B 39/14* (2013.01); *F04D 29/063* (2013.01)

(58) Field of Classification Search
CPC ..... B62J 50/21; B62M 27/02; F01N 13/1805; F01N 2340/06; F02B 2075/025;
(Continued)

(56) References Cited

U.S. PATENT DOCUMENTS 4,095,857 A * 6/1978 Palmer ................. F01D 25/186
                                                    277/423
4,523,763 A * 6/1985 Asano .................. F01D 25/183
                                                    277/421
(Continued)

FOREIGN PATENT DOCUMENTS

CN        102648334 A    8/2012
CN        104619969 A    5/2015
(Continued)

OTHER PUBLICATIONS

International Preliminary Report on Patentability received for PCT Patent Application No. PCT/CN19/102974, dated Mar. 10, 2022, 6 pages.
(Continued)

*Primary Examiner* — Jesse S Bogue
(74) *Attorney, Agent, or Firm* — Faegre Drinker Biddle & Reath LLP

(57) ABSTRACT

A seal system for a bearing chamber of a turbomachine includes a baffle element encircling the axis of the machine. The baffle element is formed with front surface including a plurality of gutter surfaces which are angularly spaced about the rotational axis. The seal system can thus be mounted in any one of a plurality of orientations with respect to the direction of gravity, such that in any of the orientations one of the gutter surfaces is directed downwardly.

7 Claims, 10 Drawing Sheets

(58) Field of Classification Search
CPC .... F02B 37/025; F02B 37/183; F02B 37/186; F02B 39/14; Y02T 10/12; Y02T 10/40; F02D 13/0242; F02D 2041/1422; F02D 2200/0404; F02D 2200/0406; F02D 2200/101; F02D 2200/703; F02D 23/00; F02D 2400/04; F02D 41/0007; F02D 41/10; F02D 41/22; F02D 41/2474; F02D 9/105; F01D 25/186; F02C 6/12; F04D 29/063; F04D 29/102; F05D 2220/40
See application file for complete search history.

(56) References Cited

U.S. PATENT DOCUMENTS

| | | | | |
|---|---|---|---|---|
| 4,664,605 A * | 5/1987 | Asano | ............... | F04D 29/106 417/407 |
| 9,850,911 B2 * | 12/2017 | Dayalan | ............ | F04D 29/063 |
| 10,473,207 B2 * | 11/2019 | Nishioka | ............ | F16C 33/1025 |
| 10,502,263 B2 * | 12/2019 | Wood | ............... | F16C 33/1045 |
| 10,605,160 B2 * | 3/2020 | Futae | ............... | F16C 33/1025 |
| 11,015,526 B2 * | 5/2021 | Burnside | ............ | F16C 33/6685 |
| 2017/0276233 A1 * | 9/2017 | Nishioka | ............ | F04D 29/056 |
| 2022/0065133 A1 * | 3/2022 | Purdey | ............... | F16N 31/00 |

FOREIGN PATENT DOCUMENTS

| | | |
|---|---|---|
| CN | 105452615 A | 3/2016 |
| CN | 106715936 A | 5/2017 |
| WO | 9220904 A1 | 11/1992 |
| WO | 2017/149671 A1 | 9/2017 |
| WO | 2017149671 A1 | 9/2017 |

OTHER PUBLICATIONS

International Search Report and Written Opinion for International Application No. PCT/CN2019/102974, dated May 29, 2020.

\* cited by examiner (a)           (b)

(a)

(b)

BAFFLE ELEMENT, DIFFUSER PLATE, AND SEAL SYSTEM INCORPORATING A BAFFLE ELEMENT AND A DIFFUSER PLATE

CROSS-REFERENCE TO RELATED APPLICATIONS

The present application is a national phase filing based on and claiming priority to PCT Application No. PCT/CN2019/102974, filed on Aug. 28, 2019, the entire disclosures of which being expressly incorporated herein by reference.

FIELD OF THE DISCLOSURE

The present disclosure relates to a turbomachine, and in particular to a turbomachine having a seal system comprising a baffle element. The turbomachine may be a turbocharger or power turbine. The present disclosure further relates to a baffle element for use in the turbomachine, and to a seal system for use in the turbomachine.

BACKGROUND OF THE DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of a rotor driven by a fluid to do useful work, for example, generating electrical power; and a compressor which uses the rotational energy of the rotor to compress a fluid.

Turbochargers are well-known turbomachines for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings.

FIG. 1 shows a schematic cross-section through a known turbocharger. The turbocharger comprises a turbine 1 joined to a compressor 2 via a central bearing housing 3. The turbine 1 comprises a turbine wheel 4 for rotation within a turbine housing 5 about an axis 25. Similarly, the compressor 2 comprises a compressor wheel 6 which can rotate within a compressor housing 7. The compressor housing 7 defines a compressor chamber within which the compressor wheel 6 can rotate. The turbine wheel 4 and compressor wheel 6 are mounted on opposite ends of a common turbocharger shaft 8 which extends through the central bearing housing 3. In this document, the term "front" refers to the direction to the right in FIG. 1 (i.e., along the rotational axis towards the turbine wheel 4), while the term "rear" refers to the direction to the left in FIG. 2 (i.e., along the rotational axis towards the compressor wheel).

The turbine housing 5 has at least one exhaust gas inlet volute 9 (in FIG. 1 two volutes are shown) located annularly around the turbine wheel 4, and an axial exhaust gas outlet 10. The compressor housing 7 has an axial air intake passage 11 and a volute 12 arranged annularly around the compressor chamber. The volute 12 is in gas flow communication with a compressor outlet 13.

The bearing housing 3 defines a bearing chamber 22 through which the turbocharger shaft 8 passes. The shaft 8 is rotatably supported by a bearing assembly which comprises two journal bearings 14 and 15 housed towards the turbine end and compressor end respectively of the bearing housing 3. The bearing assembly further includes a thrust bearing 16 which interacts with an oil seal assembly including an oil slinger 17. Oil is supplied to the bearing assembly from the oil system of the internal combustion engine via oil inlet 18 and is fed to the bearings 14, 15, 16 by oil passageways 19. The oil fed to the bearings 14, 15, 16 may be used to both lubricate the bearings and to remove heat from the bearings. As the shaft 8 rotates, the slinger 17 rotates with it, and directs oil outwards (i.e., in a direction which has a radially outward component) towards a drain 20. An oil system of the internal combustion engine may be configured to return the oil from the drain 20 to the oil inlet 18.

In use, the turbine wheel 4 is rotated about the axis 25 by the passage of exhaust gas from the exhaust gas inlet 9 to the exhaust gas outlet 10. Exhaust gas is provided to exhaust gas inlet 9 from an exhaust manifold (also referred to as an outlet manifold) of the engine (not shown) to which the turbocharger is attached. The turbine wheel 4 in turn rotates the compressor wheel 6 which thereby draws intake air through the compressor inlet 11 and delivers boost air to an inlet manifold of the engine via the volute 12 and then the outlet 13.

The compressor wheel 6 creates a low pressure region at its radially inward portion, and this has an undesirable tendency to draw oil from the bearing housing 3. Leakage of oil into the compressor is a key cause of failure. To impede the movement of oil in the axial direction towards the compressor 3, a baffle 21 is provided in the bearing housing. The baffle 21 has a central opening though which the shaft 8 and the slinger 17 are threaded. The baffle 21 has a frustoconical formation which is co-axial with the rotation axis 25. The baffle 21 includes a "front" surface facing generally towards the turbine 1, and a rear surface facing towards the compressor 2. Although the slinger 17 directs some oil directly to the drain 20, the slinger 17 directs other oil against the front surface of the baffle, and the front surface of the baffle 21 includes a gutter surface which guides this oil towards the drain 20.

In known turbochargers, the passageway from exhaust gas inlet 9 to the turbine wheel 4 includes an annular inlet passageway 23 defined between facing radial walls arranged around the turbine chamber. It is known to improve turbine performance by providing vanes (not shown in FIG. 1), referred to as nozzle vanes, in the inlet passageway 23 so as to deflect gas flowing through the inlet passageway towards the direction of rotation of the turbine wheel. Each vane is generally laminar and is positioned with one radially outer surface arranged to oppose the motion of the exhaust gas within the inlet passageway (i.e., the radially inward component of the motion of the exhaust gas in the inlet passageway is such as to direct the exhaust gas against the outer surface of the vane, and it is then redirected into a circumferential motion).

Turbines may be of a fixed or variable geometry type. Variable geometry type turbines differ from fixed geometry turbines in that the geometry of the inlet passageway can be varied to optimize gas flow velocities over a range of mass flow rates so that the power output of the turbine can be varied to suit varying engine demands.

In one form of a variable geometry turbocharger, a nozzle ring carries a plurality of axially extending vanes, which extend into the air inlet, and through respective apertures ("slots") in a shroud which forms a radially extending wall of the air inlet. The nozzle ring is axially movable by an actuator to control the width of the air passage. Movement of the nozzle ring also controls the degree to which the vanes project through the respective slots.

SUMMARY

The present disclosure aims to provide a new and useful baffle element for the bearing chamber of a turbomachine, a seal system for the turbomachine comprising the baffle element, a diffuser plate for the seal system, and a turbomachine such as a turbocharger including the seal system.

In general terms, the present disclosure proposes that the baffle element of a seal system defines a plurality of gutter surfaces (surfaces which direct oil on the surface of the baffle element away from the rotational axis) which are angularly spaced about the rotational axis. An advantage of this is that it means that the seal system can be mounted in any one of a plurality of orientations with respect to the direction of gravity (the vertical direction, referred to as "down" in this specification) such that in any of the orientations one of the gutter surfaces is directed downwardly. That is, in each orientation a downward line from the center of the baffle element intercepts one of the gutter surfaces. This increases the freedom with which the seal system can be used compared to known seal systems in which the baffle typically only includes a single gutter surface so that the seal system must be mounted with this gutter surface directed downwardly.

One embodiment of the present disclosure provides a baffle element for a seal system of a turbomachine, the baffle element having a front surface which in use faces axially into a bearing chamber of the turbomachine and a rear face which in use faces axially away from the bearing chamber. The baffle element comprises an inner portion defining a circular central opening which in use is positioned on a rotational axis of the turbomachine with a center of the central opening on the axis and the perimeter of the central opening lying in a plane transverse to the axis; a wall upstanding from the front face of the baffle element at a periphery of the inner portion of the baffle element; and at least two gutter surfaces extending radially-outwardly from the inner portion though respective gaps in the wall at different respective circumferential positions about the center of the central opening.

The seal system is particularly intended for use as a part of a turbomachine which is a turbocharger. The turbocharger is preferably of the sort having a variable geometry, although in principle the turbocharger could be another conventional form, such as one having a wastegate to regulate the power output of the turbine.

At least one of the gutter surfaces may be inclined to the plane of the circular aperture. In some forms of turbomachine, this has the advantage that oil moving on the gutter surface is directed axially, aiding its passage to the drain. An additional advantage, which in the case of variable geometry turbocharger may be of primary importance since in this case the bearing chamber is typically larger and oil redirection is less important, is that forming at least one of the gutter surfaces inclined to the plane of the circular aperture may make manufacturing the baffle element easier and cheaper, for example if the baffle element is formed by stamping a flat sheet of metal. Whether or not a given gutter surface is inclined to the plane of the circular aperture, the gutter surface may be substantially flat.

Preferably the front surface of the baffle includes a recess portion which is axially rearward with respect to the central opening of the inner portion of the baffle element. The channel is circumferentially extending in the sense that it extends further in the circumferential direction (i.e., around the rotational axis) than in the radial direction, preferably at least three times further, or at least 5 times further. Indeed, the channel may extend 360 degrees about the axis. The channel preferably intercepts at least one of the gutter surfaces so that oil moving circumferentially in the channel encounters the gutter surface and is directed by it through the corresponding gap in the wall.

The channel decreases in cross-sectional area close to at least one of the gutter surfaces and may indeed not exist at all at a circumferential position in register with at least one of the gutter surfaces. Note that the channel itself is defined as the volume contained between the front surface of the baffle element and the plane including the central opening in the baffle element. The cross-sectional area of the channel at each circumferential position about the center of the opening in the baffle element (i.e., each angular position about the rotational axis) may be measured as the intersection of the channel with a respective plane including the rotational axis and extending from the rotational axis at the corresponding angular position about the rotational axis. The cross-sectional area may be greatest at a circumferential position about the axis which is circumferentially spaced from the gutter.

Similarly, the depth of the channel may be different at different respective circumferential positions about the center of the opening in the baffle element (the depth of the channel for a given circumferential position being defined the maximum amount by which any point on the front surface of the baffle at that circumferential position is recessed with respect to the plane including the central opening in the baffle element). The channel may have a maximum depth which is greatest at circumferential positions which are spaced from the gutter surfaces (e.g., not in angular register with one of the gaps in the wall). From another point of view, the depth of the channel at at least one "gutter circumferential position" (i.e., a circumferential position which is in register with one of the gutter surfaces) or even at all gutter circumferential positions, may be less than the maximum depth of the channel (i.e., the depth of the channel at one of the circumferential position(s) for which the depth is maximal).

The channel may have circular symmetry about the axis for a certain angular range about the axis (such as at least 120 degrees, at least 180 degrees, at least 220 degrees or even at least 270 degrees about the rotational axis). In this case, the recess portion of the front surface may include at least part of the circle (i.e., that part of the circle lies on the recess portion of the front surface).

The baffle element may be an integral (i.e., one-piece) member. It may be laminar. That is, sheet-like (e.g., having a substantially constant thickness at all points on the front surface, including the gutters (i.e., the portions of the baffle element on which the gutter surfaces are formed), but not necessarily flat (planar)). It may, for example, as mentioned above, be formed by folding a flat blank of uniform thickness.

The baffle element may be contacted and supported by a diffuser plate which in turn may be supported by a portion of the bearing housing (which may be referred to as the seal plate). The diffuser plate may have a front surface defining a central aperture and arranged to conform with the rear surface of the baffle element, whereby upon placing the baffle element against the diffuser plate the diffuser plate supports the baffle element with the central opening of the baffle element in register with the central aperture of the diffuser plate, and with the baffle element in a fixed angular position about the rotational axis (i.e., about the central aperture of the diffuser plate).

For example, the diffuser plate may comprise a plurality of circumferentially spaced protrusions subtending the central aperture of the diffuser plate and arranged to contact the wall of the baffle plate. Upon placing the baffle element against the diffuser plate, the gutter surfaces extend through respective circumferential gaps between the protrusions.

Connecting elements may be provided for mounting the baffle element on the diffuser plate, and/or mounting the diffuser plate on the seal plate.

As described herein, the expression that a surface of an object "faces" in a certain direction (e.g., towards a second object) means that a normal direction to the surface, in the direction out of the object, has a positive component in the certain direction (e.g., moving from the object along the normal direction brings one closer to the second object at least initially).

In further aspects, the present disclosure provides a combination of the diffuser plate and the baffle element; a seal system comprising the diffuser plate, the baffle element and an oil slinger element; and a turbomachine, such as a turbocharger, particularly a variable geometry turbocharger, comprising the seal system.

Generally, in use the baffle element is at one axial end of the bearing chamber, and its front surface faces a central portion of the baffle chamber. In the case of a turbocharger, the front surface of the baffle element preferably faces along the axis of the turbocharger towards the turbine section of the turbocharger. Note that the normal direction to the front surface, at any given portion of the front surface, may be inclined to the rotational axis.

Another embodiment of the present disclosure provides a diffuser plate operative for use with a baffle element in a seal system of a turbomachine. The baffle element has a front surface which in use faces axially into a bearing chamber of the turbomachine, and a rear face which in use faces axially away from the bearing chamber. The baffle element comprises an inner portion defining a circular central opening which in use is positioned on a rotational axis of the turbomachine with a center of the central opening on the axis and the perimeter of the central opening lying in a plane transverse to the axis; a wall upstanding from the front face of the baffle element at a periphery of the inner portion of the baffle element; and at least two gutter surfaces extending radially-outwardly from the inner portion though respective gaps in the wall at different respective circumferential positions about the center of the central opening. The diffuser plate has a front surface defining a central aperture and arranged to conform with the baffle element. Upon placing the baffle element against the diffuser plate, the diffuser plate supports the baffle element with the central opening of the baffle element in register with the central aperture of the diffuser plate and in a fixed angular position about the central aperture of the diffuser plate.

Yet another embodiment of the present disclosure provides a turbomachine comprising a housing defining a bearing chamber; a shaft having a longitudinal axis where a portion of the shaft is within the bearing chamber; a plurality of bearing elements mounted on the housing within the bearing chamber where the bearing elements support the shaft and permit the shaft to rotate about the axis; an oil delivery mechanism for supplying oil to the bearing elements; a baffle element having a front surface which faces axially into the bearing chamber and a rear face which faces axially away from the bearing chamber; a diffuser plate having a front surface defining a central aperture and arranged to conform with the baffle element where the baffle element is located against the diffuser plate; and a slinger element coupled to the shaft. The baffle element comprises an inner portion defining a circular central opening positioned with a center of the central opening on the longitudinal axis and the perimeter of the central opening lying in a plane transverse to the longitudinal axis; a wall upstanding from the front surface of the baffle element at a periphery of the inner portion of the baffle element; and at least two gutter surfaces extending radially-outwardly from the inner portion though respective gaps in the wall at different respective circumferential positions about the center of the central opening. The diffuser plate supports the baffle element with the central opening of the baffle element in register with the central aperture of the diffuser plate and in a fixed angular position about the central aperture of the diffuser plate.

BRIEF DESCRIPTION OF THE DRAWINGS

A non-limiting embodiment of the present disclosure will now be described, for the sake of example only, with reference to the following figures, in which.

DETAILED DESCRIPTION

Figure 1:
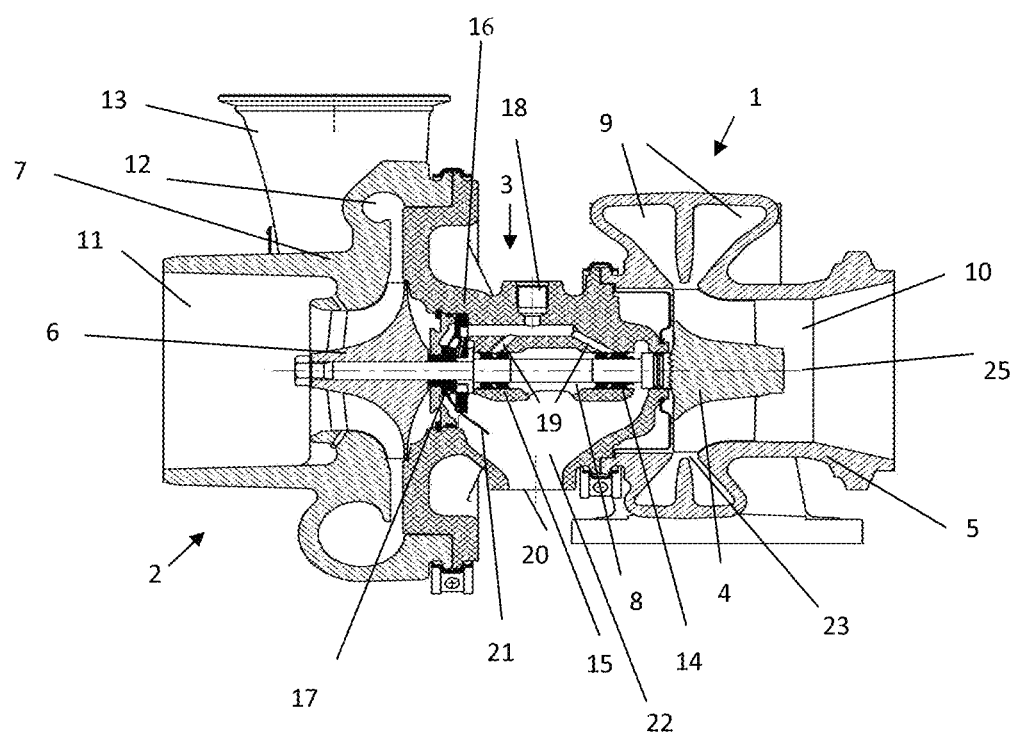
FIG. 1 is a cross-sectional drawing of a known turbocharger.

Embodiments of the present disclosure will now be described which are seal systems, or elements of seal systems, or turbomachines incorporating the seal systems. In particular, the turbomachine may be a turbomachine of a variable geometry type. The turbomachine may be a turbocharger which, apart from the seal system, is of the known type described above in relation to FIG. 1, and elements of FIG. 1 which appear in other figures of this specification are given the same reference numerals.

Referring firstly to FIG. 2(a), a baffle element 100 is shown which is an embodiment of the present disclosure. FIG. 2(b) is a perspective view of the baffle element with a section cut-away.

The baffle element comprises a central circular aperture 101 having a perimeter which is a circular rim 102. The perimeter of the central circular aperture 101 lies in a plane (the "plane of the circular aperture"). In use, the baffle element is placed with the plane of the circular aperture transverse to the rotational axis of a turbomachine (indicated as 25 in FIG. 1 and FIG. 12 below), with the rotational axis passing through the center of the circular aperture 101. The word "circumferential" is used in this document to refer to differences in angular position about the axis 25.

The surface of the baffle element 100 which faces in one direction along the axis 25, and which is generally the surface which is visible in FIG. 2(a), is referred to as the "front surface." This faces towards the middle of the bearing chamber. When the seal system is employed in a turbocharger, the front surface faces towards the turbine. The opposite surface of the baffle element, which faces in the opposite direction along the axis 25 is referred to as the "rear surface," and faces away from the bearing chamber and the turbine. When the seal system is employed in a turbocharger, the rear surface faces away from the turbine.

The circular aperture 101 is defined by an annular inner portion 103 of the baffle element, which is illustrated in FIG. 2(a) as flat and circularly symmetric. At the periphery of the inner portion 103 is a channel 104. That is, a region where the front surface of the baffle element 100 is recessed (i.e., rearward compared to the plane of the circular aperture). Radially outward of the channel 104 is a wall 105 composed of two portions 106, 107. The wall portions 106, 107 are circumferentially spaced (i.e., there are circumferential gaps 108, 109 between them). Within the circumferential gaps are respective gutter surfaces 110, 111 which are portions of the front surface of the baffle element 100. The gutter surfaces 110, 111 are typically mirror symmetric about respective planes including the axis 25 which pass through centers of the gutter surfaces 110, 111 (and the centers of the gaps 108, 109). The radial planes are mutually spaced apart by an angle about the axis 25 which may be at least 70 degrees, or at least 90 degrees, and may be no more than 130 degrees or no more than 120 degrees. A preferred range is from 90 to 120 degrees.

The gutter surface 110 is inclined plane of the circular aperture (i.e., to the axis 25) whereas the gutter surface 111 lies substantially in the plane of the circular aperture (i.e., it is orthogonal to the axis 25). In fact, as is visible in FIG. 2(b), the gutter surface 108 is very slightly inclined to the circular aperture (i.e., its radially outward portion is shown as very slightly rearward of the radially inner portion).

Figure 3:
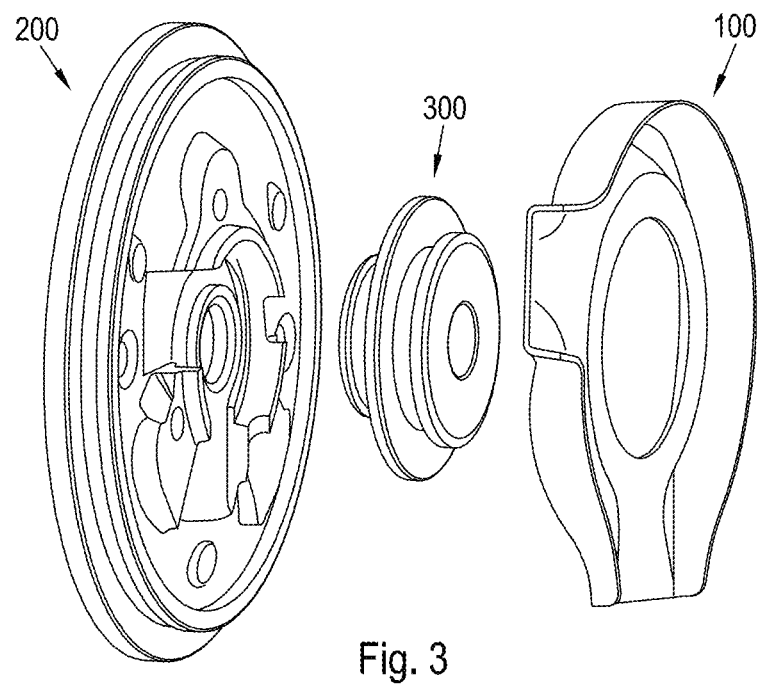
FIG. 3 is an exploded view of a seal system comprising the baffle element of FIG. 2, an oil slinger element, and a diffuser plate which is a further embodiment of the present disclosure.

FIG. 3 shows a seal system comprising the baffle element 100 of FIG. 1, together with a diffuser plate 200 and an oil slinger element 300. In use, the seal system is provided within a bearing housing of the turbomachine, at one end of a bearing chamber. The slinger element 300 is fast with a rotating shaft of the turbomachine which rotates about the axis 25 with respect to the bearing housing, and the baffle element 100 is supported by the diffuser plate 200 at a fixed rotational position about the axis 25. The diffuser plate 200 in turn is fast with the seal plate of the bearing housing.

Figure 4:
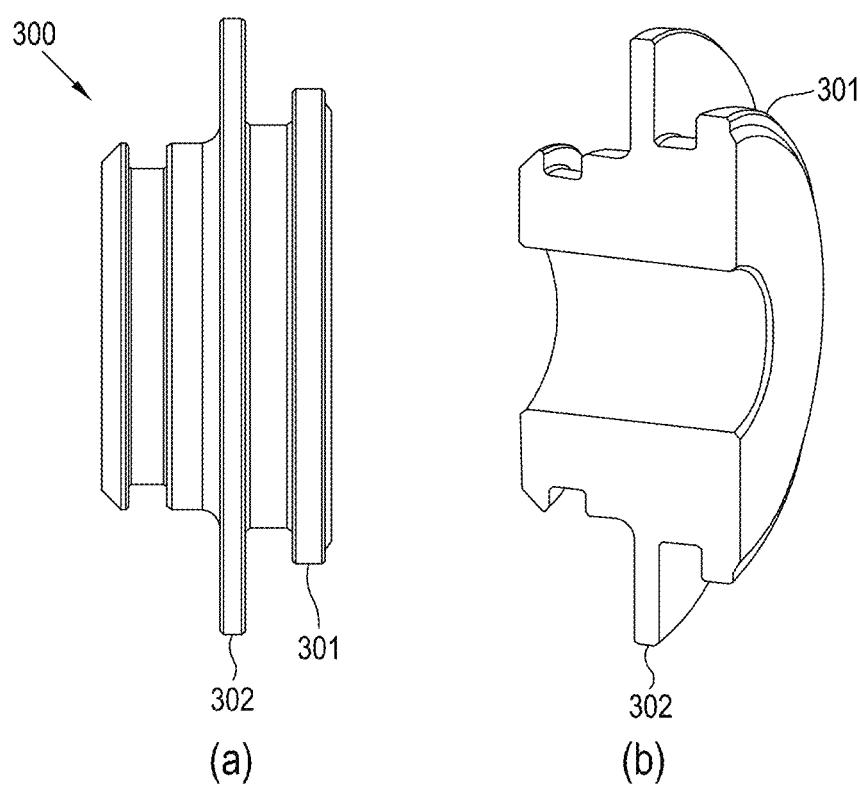
FIG. 4 is composed of FIG. 4(a) which is a side view of the slinger element of FIG. 2, and FIG. 4(b) which is a perspective cut-away view of the slinger element.

FIG. 4(a) is a side view of the slinger element 300, and FIG. 4(b) is a perspective cut-away view of the slinger element bisected by a plane including the rotational axis 25. The slinger element is circularly symmetric about an axis which in use coincides with the rotational axis 25. It includes a first radially extending ridge 301 which in use is inserted through the circular aperture 101 of the baffle element 100, and second radially extending ridge 302 which in use is faced by the rear surface of the baffle element 100. The second ridge 302 extends radially further from the axis 25 than the first ridge 301.

Figure 2:
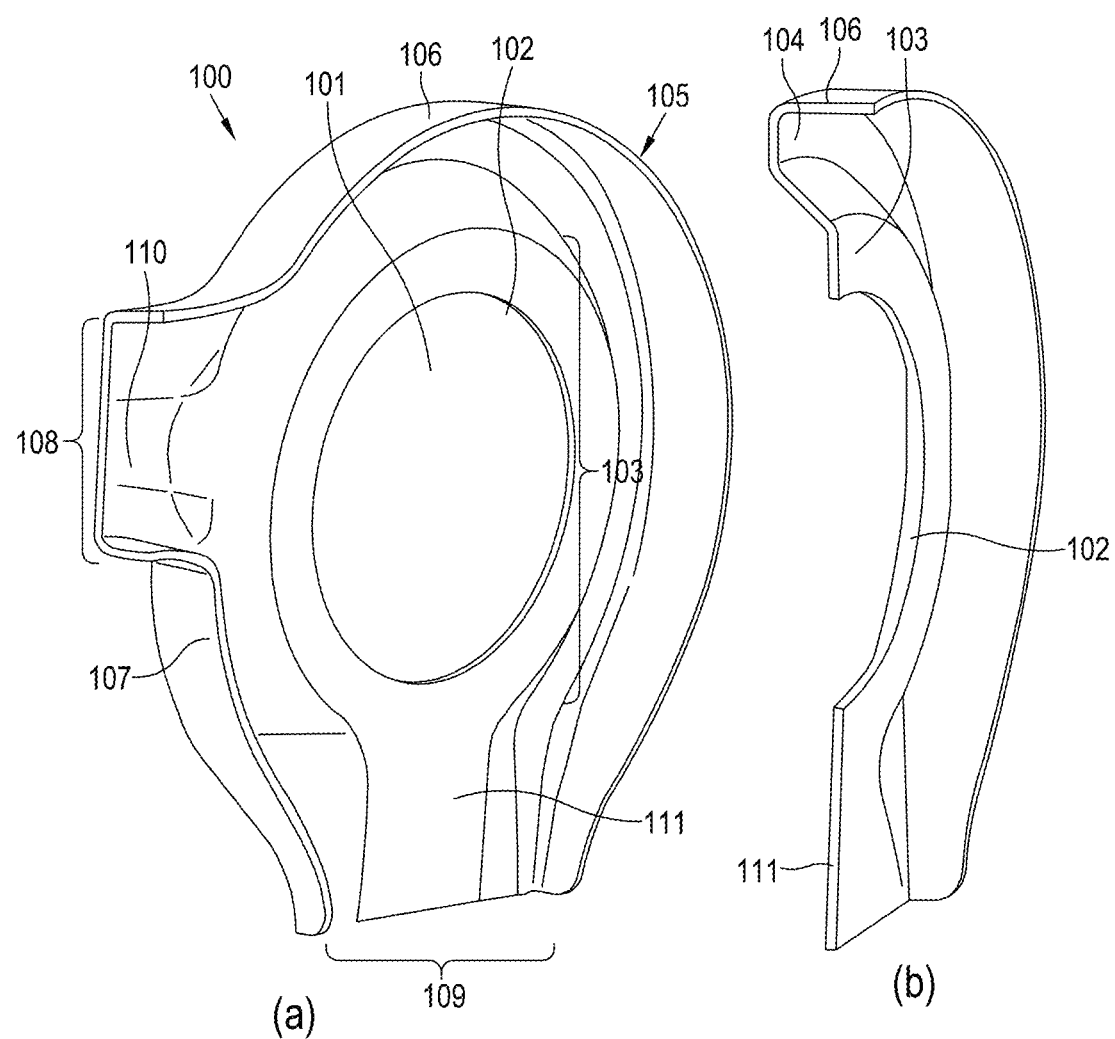
FIG. 2 is composed of FIG. 2(a) which is a perspective view of an embodiment of the present disclosure which is baffle element, and FIG. 2(b) which is a perspective cut-away view of the baffle element.
Figure 5:
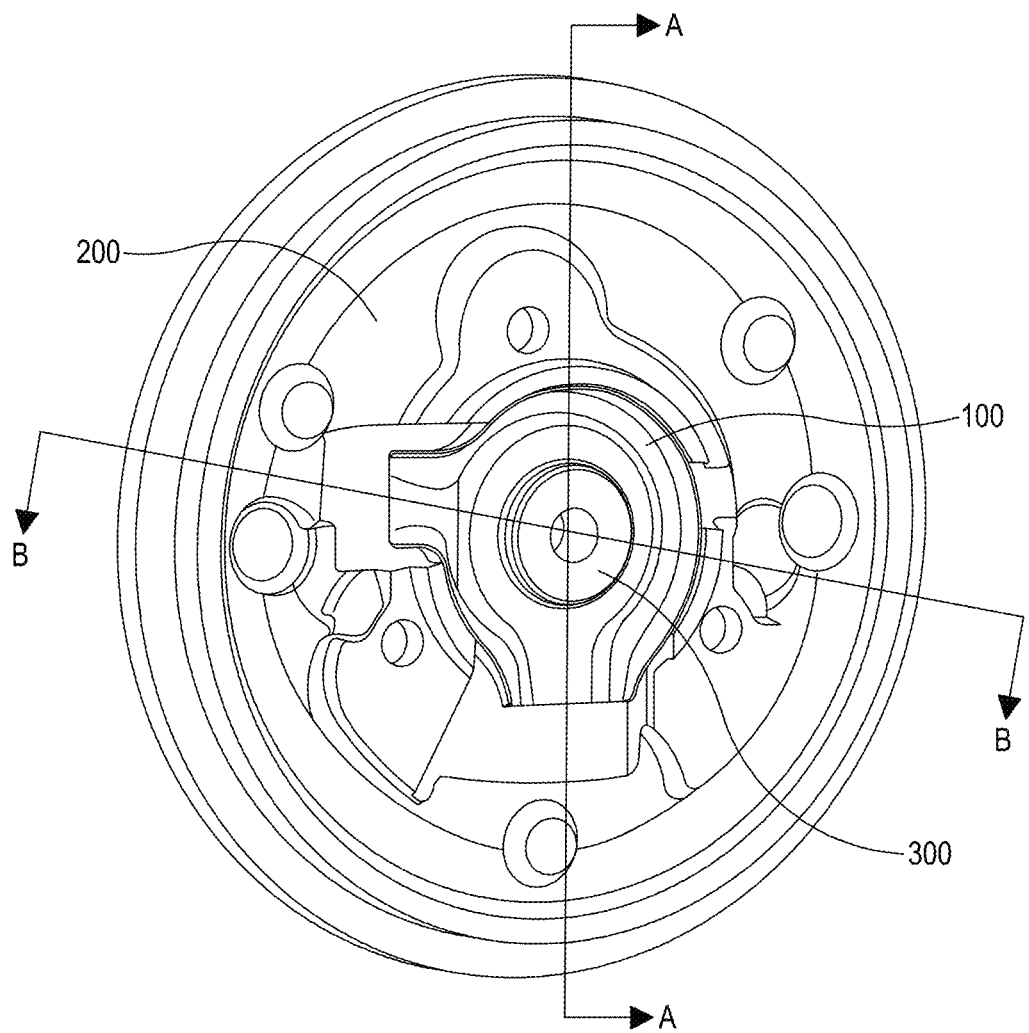
FIG. 5 is a perspective view of the assembled seal system.
Figure 6:
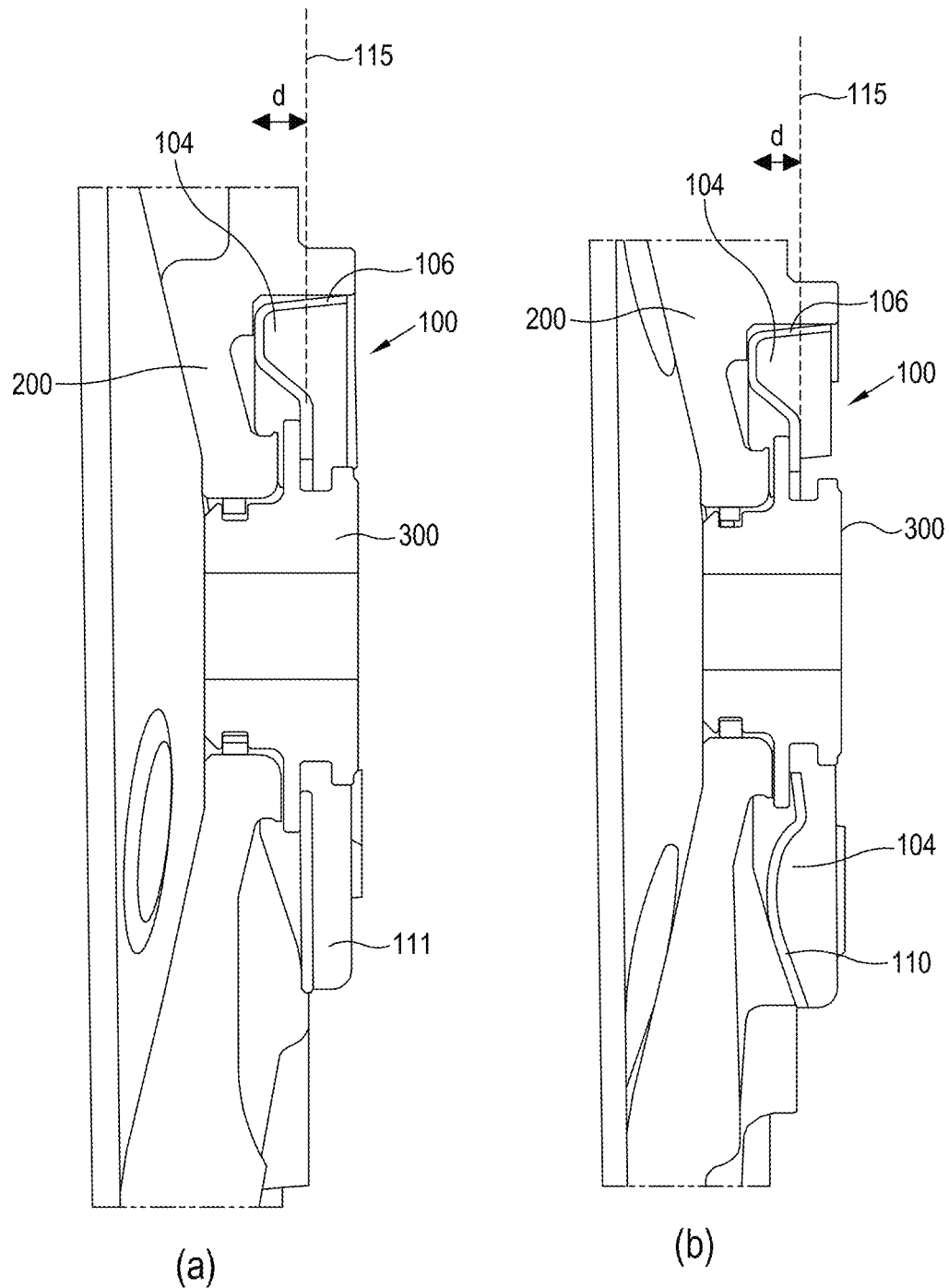
FIG. 6 is composed of FIGS. 6(a) and 6(b) which are different cross-sectional views of the assembled seal system.

FIG. 5 is a perspective view of the seal system of FIG. 2 in an assembled configuration. FIGS. 6(a) and 6(b) are respective cross-sections of the assembled seal system, respectively in the planes marked as A-A and B-B in FIG. 5.

Note that the channel 104 is visible at the top of FIGS. 6(a) and 6(b), but substantially does not exist in the lower part of FIG. 6(a) and is shallow in the lower part of FIG. 6(b). To express this more specifically, FIGS. 6(a) and 6(b) indicate the depth d of the channel 104 for the circumferential position corresponding to the top of the figures. This is the maximum distance by which any point on the front face of the baffle at this circumferential position is recessed (i.e., rearward) of the plane of the circular aperture (indicated by the dashed line 115). It will be seen that this distance d is greater than the depth of the channel at the circumferential positions of the gutter surfaces 110, 111 (i.e., respectively in the lower part of FIG. 6(a) where d is substantially zero, and the lower part of FIG. 6(b)).

Figure 7:
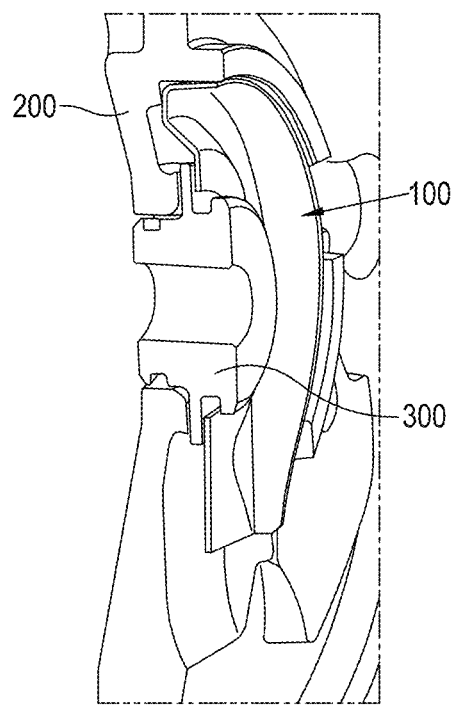
FIG. 7 is a perspective cut-away view of the assembled seal system.

FIG. 7 is a cut-away perspective view of the assembled seal system, where the portion of the seal system to one side of the plane A has been removed.

Figure 8:
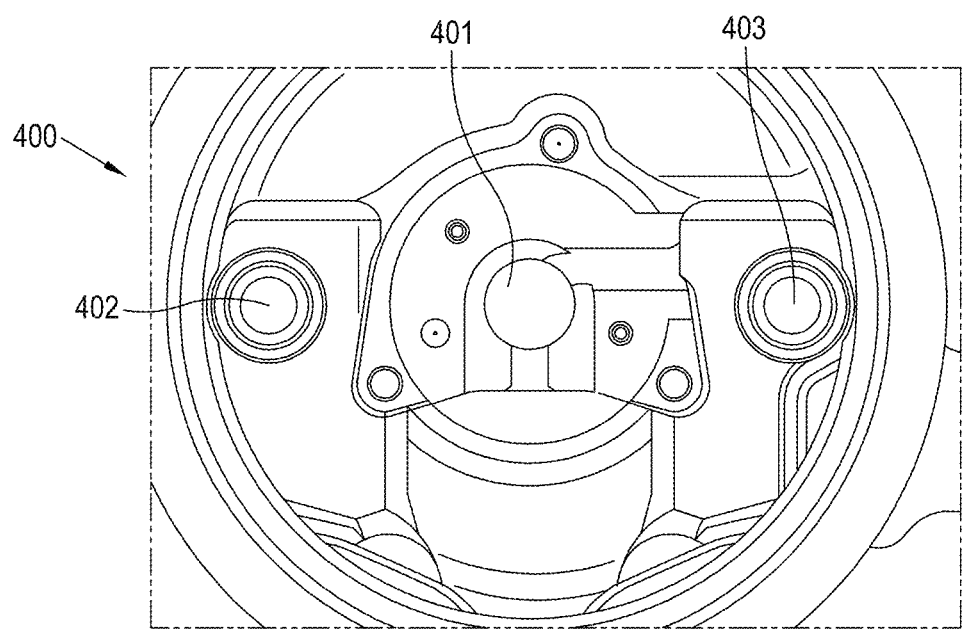
FIG. 8 is a view of a seal plate of the bearing housing.

FIG. 8 shows a seal plate 400 which is the portion of the bearing housing at one end of the bearing chamber. It includes a central aperture 401, surrounded by a contoured surface which is adapted to receive the rear face of the diffuser plate 200. The seal plate 400 is provided with apertures 402, 403 for fastening the diffuser plate 200 to the seal plate 400.

Figure 9:
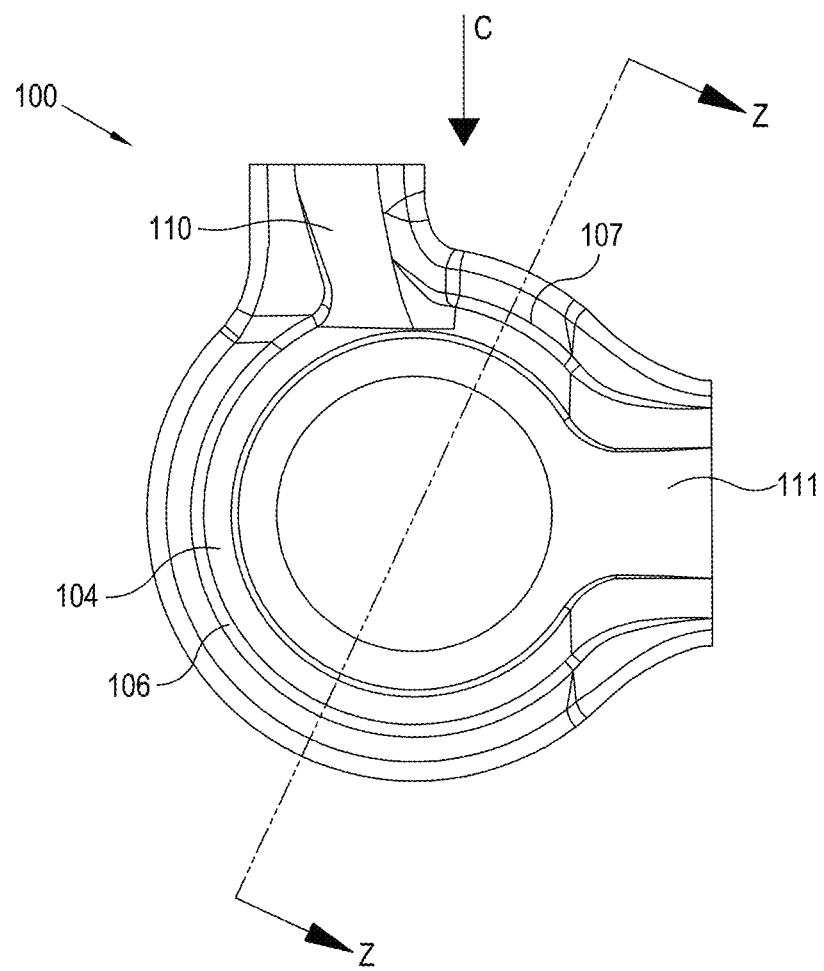
FIG. 9 is a rear view of the baffle element of FIG. 2.
Figure 10:
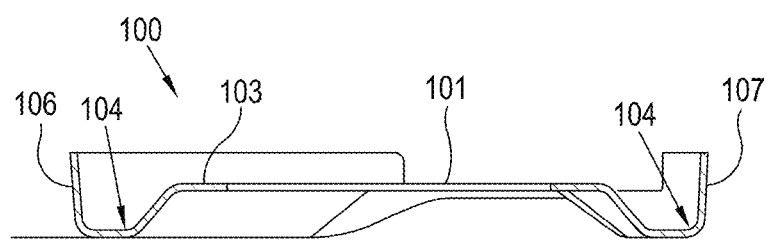
FIG. 10 is composed of FIG. 10(a) which is a cross-sectional view of the baffle element of FIGS. 2, and 10(b) which is a side view of the baffle element of FIG. 2.
Figure 10:
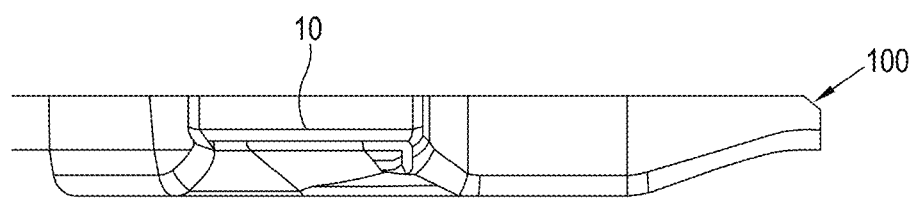

FIG. 9 is a rear view of the baffle element 100. FIG. 10(a) shows a cross-section of the baffle element 100 in the plane marked as Z-Z in FIG. 9. FIG. 10(b) shows a view of the baffle element 100 looking in the direction marked as C in FIG. 9.

Figure 11:
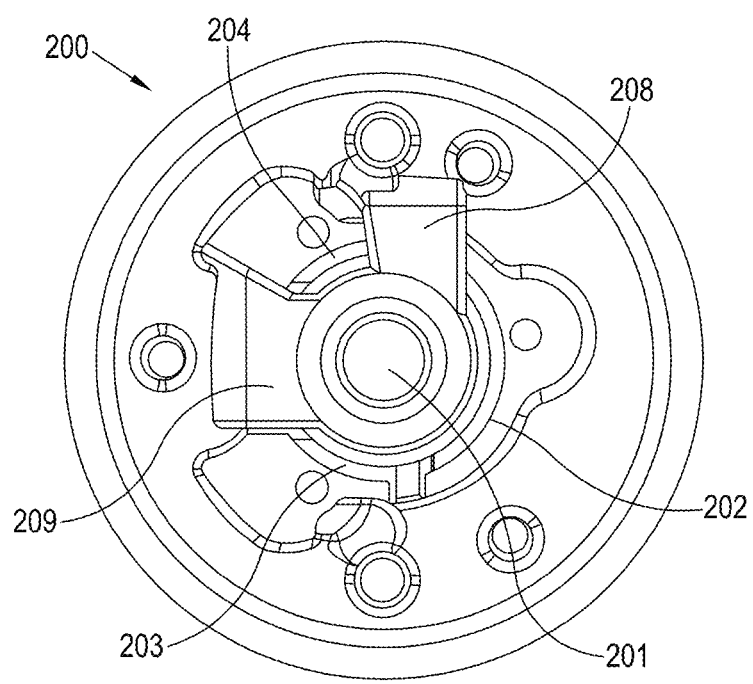
FIG. 11 is a view of the front surface of the diffuser plate of FIG. 3.

FIG. 11 is a view of the front face of the diffuser plate 200. The diffuser plate 200 defines a central aperture 201. It includes forwardly-projecting circumferentially elongate protrusions 202, 203 which are shaped to rest in use against a circumferentially elongate portion of the rear surface of the wall 106 of the baffle element 100, and a forwardly projecting elongate protrusion 204 which is positioned to rest against a circumferentially elongate portion of the rear surface of the wall 107 of the baffle element. The elongate protrusions 202, 203, 204 are in use radially outward of the corresponding walls 106, 107 of the baffle element, and help to retain the baffle element in a fixed position relative to the diffuser plate 220. Two circumferential gaps 208, 209 defined respectively between the protrusions 202 and 204, and protrusions 203 and 204, correspond in angular position to respective ones of the gutter surfaces 110, 111. Interaction between the rear surface of the baffle element 100 and the protrusions 202, 203, 204, particularly the portions of the protrusions at each side of the gaps 208, 209, may at least assist in fixing the angular position of the baffle element 100 about the axis 25.

Figure 12:
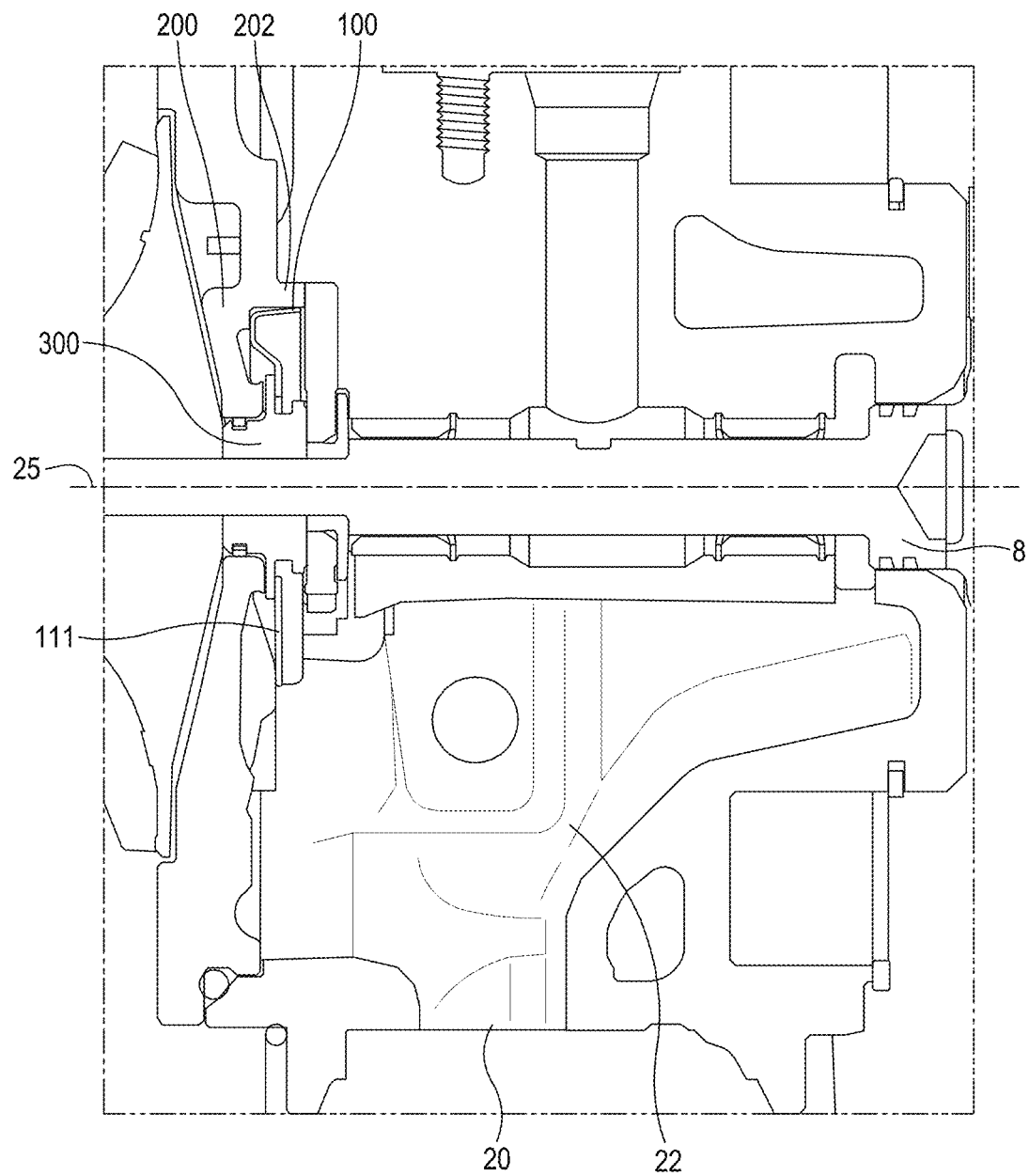
FIG. 12 is a cross-sectional view of a portion the bearing housing of a turbomachine including the seal system of FIG. 3.

Finally, FIG. 12 shows is cross-section a portion of a turbomachine which is an embodiment of the present disclosure. The turbomachine may be a turbocharger (e.g., a variable geometry turbocharger), which is identical to the known turbocharger shown in FIG. 1, except that the seal system which is provided between the bearing chamber 22 and the compressor wheel 6 takes the form described above and illustrated with respect to FIGS. 2 to 11. The drain 20 is positioned, in the case shown in FIG. 12, such that the direction of gravity is the direction from the shaft 8 to the drain 20 (i.e., the top to bottom direction in FIG. 12). The gutter surface 111 projects radially from the axis 25 substantially in the direction of gravity and directs oil on the front surface of the baffle element 110 to the drain 20.

Note however, that the turbocharger could also be positioned in a different orientation in which, compared to the configuration of FIG. 12, it is rotated about the axis 25 such that a second drain of the bearing housing (not shown in FIG. 12 because it is out of the plane of the diagram) is spaced in the direction of gravity from the shaft 8. In this case, the gutter surface 110 may be directed generally downwardly from the axis 22, so that the gutter surface 110 is positioned to direct oil on the front surface of the baffle element 110 to the second drain. Note that optionally the first drain 20 and drain may be respective drain portions of a single aperture in the bearing housing, circumferentially displaced from each other about the axis 25.

Note that typically the two possible orientations of the turbocharger are about 90 degrees apart about the rotational axis 25, but the respective central planes of the gutter surfaces 110, 111 may not be 90 degrees apart about the axis 25, to take into account other constraints on the baffle element design, such as wall thickness, strength, etc., as well as the feasibility of assembling the turbocharger. The angle between the central planes of the gutter surfaces 110, 120 may for example be in the angular range of 90-120 degrees, as mentioned above.

Thus, the seal system may be operative to direct oil from the front surface of the baffle element to a respective one of the two drains (or two drain portions) irrespective of whether the gutter surface 110 or the gutter surface 111 extends generally downward (i.e., generally in the direction of gravity) from the axis 25. Thus, the turbocharger containing the bearing housing depicted in FIG. 12 can be used in either of these two configurations.

A number of variations are possible within the scope of the present disclosure as defined by the claims. For example, in the embodiment described one gutter surface 110 is inclined to the axis (i.e., a normal direction to the gutter surface is neither at an angle of substantially zero nor an angle of substantially 90 degrees with respect to the axis 25), and the other gutter surface 111 is transverse to the axis 25. However, in a variation both of the gutter surfaces may be inclined to the axis 25, or both may be transverse to it.

In another example, although in the embodiment depicted the gutter surfaces 110, 111 are mutually circumferentially displaced by an angle of about 120 degrees, in variations the circumferential spacing between the gutter surfaces 110, 111 may be greater or less than this. For example, it may be about 90 degrees.

The invention claimed is:

1. A baffle element for a seal system of a turbomachine, the baffle element having a front surface which in use faces axially into a bearing chamber of the turbomachine, and a rear face which in use faces axially away from the bearing chamber, the baffle element comprising:
    an inner portion defining a circular central opening which in use is positioned on a rotational axis of the turbomachine with a center of the central opening on the axis and the perimeter of the central opening lying in a plane transverse to the axis;
    a wall upstanding from the front surface of the baffle element at a periphery of the inner portion of the baffle element; and
    at least two gutter surfaces extending radially-outwardly from the inner portion through respective gaps in the wall at different respective circumferential positions about the center of the central opening, the gutter surfaces each being mirror symmetric about respective planes which pass through the center of the central opening; and the front surface comprises a recess portion which is axially rearward with respect to the central opening of the inner portion of the baffle element, the recess portion defining a circumferentially extending oil reception channel, and wherein the channel includes a different depth at different circumferential positions, the depth of the channel of at least one circumferential position which is in register with one of the gutter surfaces being less than the maximum depth of the channel.

2. The baffle element of claim 1, wherein at least one of the gutter surfaces is inclined to the plane of the circular central opening.

3. The baffle element of claim 1, wherein the channel intercepts at least one of the gutter surfaces, whereby oil moving circumferentially in the channel encounters the gutter surface and is directed through the corresponding gap in the wall.

4. The baffle element of claim 1, wherein the channel includes varying cross-sectional area at different circumferential positions, the cross-sectional area at the different circumferential positions being measured as the intersection of the channel with respective planes including the axis, the cross-sectional area being greatest at a circumferential position about the axis which is circumferentially spaced from the at least two gutter surfaces.

5. The battle element of claim 1, wherein at least one of the gutter surfaces is substantially flat.

6. A diffuser plate operative for use with a baffle element in a seal system of a turbomachine,
    the baffle element having a front surface which in use faces axially into a bearing chamber of the turbomachine, and a rear face which in use faces axially away from the bearing chamber, the baffle element comprising:
        an inner portion defining a circular central opening which in use is positioned on a rotational axis of the turbomachine with a center of the central opening on the axis and the perimeter of the central opening lying in a plane transverse to the axis;
        a wall upstanding from the front surface of the baffle element at a periphery of the inner portion of the baffle element; and
        at least two gutter surfaces extending radially-outwardly from the inner portion through respective gaps in the wall at different respective circumferential positions about the center of the central opening, the gutter surfaces each being mirror symmetric about respective planes which pass through the center of the central opening; and
    the diffuser plate having a front surface defining a central aperture and arranged to conform with the baffle element, wherein upon placing the baffle element against the diffuser plate the diffuser plate supports the baffle element with the central opening of the baffle element in register with the central aperture of the diffuser plate and in a fixed angular position about the central aperture of the diffuser plate; and further comprising a plurality of circumferentially spaced protrusions subtending the central aperture of the diffuser plate and arranged to contact the wall of the baffle element, wherein upon placing the baffle element against the diffuser plate the gutter surfaces extend through respective circumferential gaps between the protrusions.

7. A baffle element for a seal system of a turbomachine, the baffle element having a front surface which in use faces axially into a bearing chamber of the turbomachine, and a rear face which in use faces axially away from the bearing chamber, the baffle element comprising:
    an inner portion defining a circular central opening which in use is positioned on a rotational axis of the turbomachine with a center of the central opening on the axis and the perimeter of the central opening lying in a plane transverse to the axis;
    a wall upstanding from the front surface of the baffle element at a periphery of the inner portion of the baffle element; and
    at least two gutter surfaces extending radially-outwardly from the inner portion through respective gaps in the wall at different respective circumferential positions about the center of the central opening,
    wherein the front surface comprises a recess portion which is axially rearward with respect to the central opening of the inner portion of the baffle element, the recess portion defining a circumferentially extending oil reception channel, and
    wherein the channel includes varying cross-sectional area at different circumferential positions, the cross-sectional area at the different circumferential positions being measured as the intersection of the channel with respective planes including the axis, the cross-sectional area being greatest at a circumferential position about the axis which is circumferentially spaced from the at least two gutter surfaces.

\* \* \* \* \*